(12) United States Patent
McGranahan

(10) Patent No.: US 10,060,823 B2
(45) Date of Patent: Aug. 28, 2018

(54) MINIATURIZED TUNED MASS DAMPER FOR APPLICATION TO HIGH SPEED WIND TUNNEL TESTING

(71) Applicant: The Boeing Company, Chicago, IL (US)

(72) Inventor: Bryan David McGranahan, O'Fallon, MO (US)

(73) Assignee: The Boeing Company, Chicago, IL (US)

( * ) Notice: Subject to any disclaimer, the term of this patent is extended or adjusted under 35 U.S.C. 154(b) by 206 days.

(21) Appl. No.: 15/048,876

(22) Filed: Feb. 19, 2016

(65) Prior Publication Data

US 2017/0241862 A1    Aug. 24, 2017

(51) Int. Cl.
*F16F 7/116*    (2006.01)
*G01M 9/04*    (2006.01)

(52) U.S. Cl.
CPC .............. *G01M 9/04* (2013.01); *F16F 7/116* (2013.01)

(58) Field of Classification Search
CPC .. F16F 7/10; F16F 7/1017; F16F 7/112; F16F 7/116; G01L 25/00; G01M 9/00; G01M 9/02; G01M 9/04; G01M 9/08
See application file for complete search history.

(56) References Cited

U.S. PATENT DOCUMENTS 2,819,775 A    1/1958    Everett
2,854,100 A    9/1958    Bowser et al.
3,173,514 A    3/1965    Tiedemann
3,572,112 A    3/1971    Igoe
3,934,535 A    1/1976    Culver
4,600,686 A    7/1986    Meyer et al.
(Continued)

FOREIGN PATENT DOCUMENTS

DE    1039851 B    9/1958
DE    3316177 A1    11/1984
(Continued)

OTHER PUBLICATIONS

Maurer Söhne, "Maurer Tuned Mass and Viscous Dampers" dated Jul. 29, 2011, retrieved from the Internet on Jul. 7, 2014 from http://www.maurersoehne.com/files/bauwerkschutzsysteme/pdf/en/brochure/MAURER_Tuned_Mass_and_Viscous_Dampers.pdf, 32 pages.
(Continued)

*Primary Examiner* — Thomas J Williams
(74) *Attorney, Agent, or Firm* — Kolisch Hartwell, P.C.

(57) ABSTRACT

A tunable mass-damping apparatus may include a housing having an interior surface, an interior volume containing a gas, and an axis. The housing may be configured to be coupled to a wind tunnel model. The mass-damping apparatus may include a mass configured to move back and forth in the interior volume along the axis. The mass may be configured to make an airtight seal with the interior surface of the housing, thereby dividing the interior volume into an upper chamber and a lower chamber. The mass-damping apparatus may include a passage through the mass fluidly connecting the chambers and at least one spring configured to exert a position-dependent force upon the mass. The spring may be characterized by a spring constant chosen based on a natural frequency of a support structure of the wind tunnel model.

20 Claims, 7 Drawing Sheets

(56) References Cited

U.S. PATENT DOCUMENTS

| | | | |
|---|---|---|---|
| 4,660,689 A | | 4/1987 | Hayashi et al. |
| 5,558,191 A | | 9/1996 | Lai |
| 5,644,075 A | * | 7/1997 | Hefer .................. G01M 9/04 |
| | | | 310/328 |
| 5,816,373 A | * | 10/1998 | Osterberg ........... F16F 7/1017 |
| | | | 188/378 |
| 7,127,942 B2 | * | 10/2006 | Gibson .................. G01M 9/08 |
| | | | 73/147 |
| 7,681,701 B2 | * | 3/2010 | Mikonaho .............. F16F 7/104 |
| | | | 188/317 |
| 2016/0069409 A1 | | 3/2016 | McGranahan et al. |

FOREIGN PATENT DOCUMENTS

| | | |
|---|---|---|
| GB | 468365 A | 12/1935 |
| GB | 539720 A | 9/1941 |
| GB | 771663 A | 4/1957 |
| WO | 9842998 A2 | 10/1998 |
| WO | 9842998 A3 | 10/1998 |

OTHER PUBLICATIONS

Superflow Technologies Group, Airflow Basics Service Procedure, URL: http://www.superflow.com/support/supportDocuments/airflow_basics.pdf, 2000, 6 pages.

Ogilvy, Fergus, "How Renault F1 Won a World Championship by Creating the Tuned Mass Damper", URL: http://mooregoodink.com/how-renault-f1-found-faster-lap-times-and-won-a-world-championship-by-creating-the-tuned-mass-damper/, Nov. 4, 2013, 3 pages.

NASA Technical Memorandum, "Reduction of Wind-Tunnel-Model Vibration by Means of a Tuned Damped Vibration Absorber Installed in the Model", NASA TM X-1606, Jan. 1, 2015, 31 pages.

Theory of Machines, TM-164 Free Vibrations of a Mass-spring System, URL: http://www.tecquipment.com/Datasheets/TM164_1015.pdf, circa before Dec. 3, 2015, 3 pages.

Wikipedia, "Damping", URL: https://en.wikipedia.org/wiki/Damping, circa before Jan. 5, 2016, 8 pages.

United States Patent and Trademark Office, Office action in U.S. Appl. No. 14/477,701, dated Sep. 17, 2015, 13 pages.

European Patent Office, Extended European Search Report in European Patent Application No. 15179083.9-1557, dated Feb. 8, 2016, 9 pages.

United States Patent and Trademark Office, Office action in U.S. Appl. No. 14/477,701, dated Feb. 17, 2016, 12 pages.

Taft et al., "Determination of the Temperature Dependent Spring Constant of a Nitinol Expansion Spring", Nov. 29, 2006, accessed online <https://www.imagesco.com/science/Nitinol-Spring%20Data.pdf> in May 2018, 13 pages.

U.S. Patent and Trademark Office, Office action in U.S. Appl. No. 15/237,375, dated May 31, 2018, 41 pages.

* cited by examiner

MINIATURIZED TUNED MASS DAMPER FOR APPLICATION TO HIGH SPEED WIND TUNNEL TESTING

FIELD

This disclosure generally relates to wind tunnel testing of model aircraft. More specifically, the disclosed embodiments relate to apparatus and methods for reducing undesirable vibrations of the model at various natural frequencies of the testing system.

DESCRIPTION OF RELATED ART

Aerodynamic testing of models in wind tunnels is a common and important part of the aeronautics industry. Accurate testing is necessary for safety, and can potentially save millions of dollars by eliminating real-world test flights. An inherent complication of wind tunnel testing is the introduction of experimental artifacts that would not be present in a real-world setting. Such artifacts include the forces exerted on a model during testing that arise from the support structure that is holding the model in place. These forces would obviously not be present on a real-world aircraft, and can interfere with any efforts to measure the forces on the model that arise from the aerodynamic performance of the model itself.

One solution to the problem of undesirable artifact forces is to reduce the dynamic pressure of the wind tunnel and hence the wind speed. This solution has the disadvantage of increasing the chance of scale effects in the wind tunnel data. A second solution is to build extra stiffness into the support structure, thus decreasing vibrations of the support structure and the associated forces on the model from the support structure. This is usually done by increasing the balance capacity and the size of the support. However, increasing the balance capacity would tend to decrease the sensitivity of the tests, and increasing the size of the support would take the model farther away from the reality it is trying to replicate, both undesirable effects. A third solution is to avoid test conditions that would give rise to unsteady aerodynamic phenomena, such as wing drop or buffet, which can excite the natural vibrational modes of the support structure. This is the worst of the three solutions, because the results of tests under such conditions are often of great interest to the end users of the wind tunnel data.

A mass-damping apparatus, or mass damper, can effectively increase the damping of a wind tunnel support system without a need for reducing wind tunnel dynamic pressure, increasing stiffness of the support, or avoiding conditions that would give rise to unsteady aerodynamic phenomena. Generally speaking, a mass damper is a damped oscillator that can be coupled to a wind tunnel model. The natural frequency of the oscillator can be chosen to coincide with a natural frequency of an undesirable artifact vibration of the wind tunnel support, which allows coupling of the motion of the damper mass with that of the wind tunnel support. This coupling enables the mass damper to influence the wind tunnel support system by replacing a single oscillatory mode with low damping with a coupled wind tunnel support/mass damper oscillation with higher damping. An optimal damping coefficient of the mass damper exists that maximizes the effect of the mass damper on the wind tunnel support. The value of optimal damping coefficient is dependent on wind tunnel support hardware, and is determined by analysis.

Existing mass dampers typically rely on friction or viscous forces to provide damping. In either case, the degree of damping may be difficult or impossible to adjust, at least without significant disassembly of the damper. For example, in mass dampers that use oil as a damping medium, to change the damping coefficient one must change the kind of oil being used, a potentially messy and time-consuming process. As a result, it may not always be possible, or at least practical, to achieve optimal damping, particularly if the damper is designed to have a variable natural frequency. In addition, friction-based dampers can experience undesirable wear at the frictional surfaces, and viscous dampers can develop leaks that affect the damping force and can damage the damper's surroundings.

Existing mass dampers can also be bulky. It may be difficult to find space for such a bulky damper within a wind tunnel model, given the structural elements of the model and the necessary monitoring equipment also present within the model.

SUMMARY

A tunable mass-damping apparatus may include a housing having an interior surface, an interior volume containing a gas, and an axis. The housing may be configured to be coupled to a wind tunnel model. The mass-damping apparatus may include a mass configured to move back and forth in the interior volume along the axis. The mass may be configured to make an airtight seal with the interior surface of the housing, thereby dividing the interior volume into an upper chamber and a lower chamber. The mass-damping apparatus may include a passage through the mass fluidly connecting the chambers and at least one spring configured to exert a position-dependent force upon the mass. The spring may be characterized by a spring constant chosen based on a natural frequency of a support structure of the wind tunnel model.

A method of calibrating a tunable mass-damping apparatus to reduce dynamic forces on a wind tunnel model during wind tunnel testing may include selecting a mass with weight equal to a predetermined percentage of weight of the wind tunnel model. The method may include selecting at least one spring with a spring constant chosen to reduce vibrations of the wind tunnel model at a natural frequency of a support structure for the wind tunnel model and selecting an orifice plate to provide a degree of damping of motions of the mass. The method may further include installing the mass, the at least one spring, and the orifice plate in a mass-damping apparatus that allows the mass to move back and forth between upper and lower gas-filled chambers, while the at least one spring exerts a position-dependent force upon the mass and while gas passes between the chambers serially through the orifice plate and a passage through the mass which fluidly connects the chambers. The method may include measuring oscillation characteristics of the assembled mass-damping apparatus, including an oscillation frequency of the mass and a characteristic damping time of the mass.

A method of reducing dynamic forces on a wind tunnel model during wind tunnel testing may include selecting a mass with weight equal to a predetermined percentage of weight of the wind tunnel model, the mass having a through passage, and selecting at least one spring with a spring constant chosen based on a natural frequency of a support structure for the wind tunnel model. The method may include attaching to the wind tunnel model a mass-damping apparatus that includes a housing having an interior surface, an interior volume containing a gas, and an axis. The housing may be configured to be coupled to a wind tunnel model. The mass-damping apparatus may further include the selected mass which may be configured to move back and forth in the interior volume along the axis. The mass may be configured to make an airtight seal with the interior surface of the housing, thereby dividing the interior volume into an upper chamber and a lower chamber. The passage through the mass may fluidly connect the chambers. The mass-damping apparatus may further include the at least one selected spring configured to exert a position-dependent force upon the mass. The method may include performing wind tunnel testing upon the model.

The present disclosure provides various apparatuses and methods of use thereof. In some embodiments an apparatus may include a mass having a through passage allowing gas to pass between two pressure chambers. In some embodiments, an apparatus may include an interchangeable orifice plate to restrict the flow of gas through the passage through the mass. Features, functions, and advantages may be achieved independently in various embodiments of the present disclosure, or may be combined in yet other embodiments, further details of which can be seen with reference to the following description and drawings.

DETAILED DESCRIPTION

Overview

Various embodiments of a mass-damping apparatus having a set of orifice plates, each plate configured to restrict airflow to varying degrees through a passage through an oscillating mass are described below and illustrated in the associated drawings. Unless otherwise specified, the mass-damping apparatus and/or its various components may, but are not required to, contain at least one of the structure, components, functionality, and/or variations described, illustrated, and/or incorporated herein. Furthermore, the structures, components, functionalities, and/or variations described, illustrated, and/or incorporated herein in connection with the present teachings may, but are not required to, be included in other similar tunable mass dampers. The following description of various embodiments is merely exemplary in nature and is in no way intended to limit the disclosure, its application, or uses. Additionally, the advantages provided by the embodiments, as described below, are illustrative in nature and not all embodiments provide the same advantages or the same degree of advantages.

EXAMPLES, COMPONENTS, AND ALTERNATIVES

The following sections describe selected aspects of exemplary mass dampers as well as related systems and/or methods. The examples in these sections are intended for illustration and should not be interpreted as limiting the entire scope of the present disclosure. Each section may include one or more distinct inventions, and/or contextual or related information, function, and/or structure.

Example 1

Figure 1:
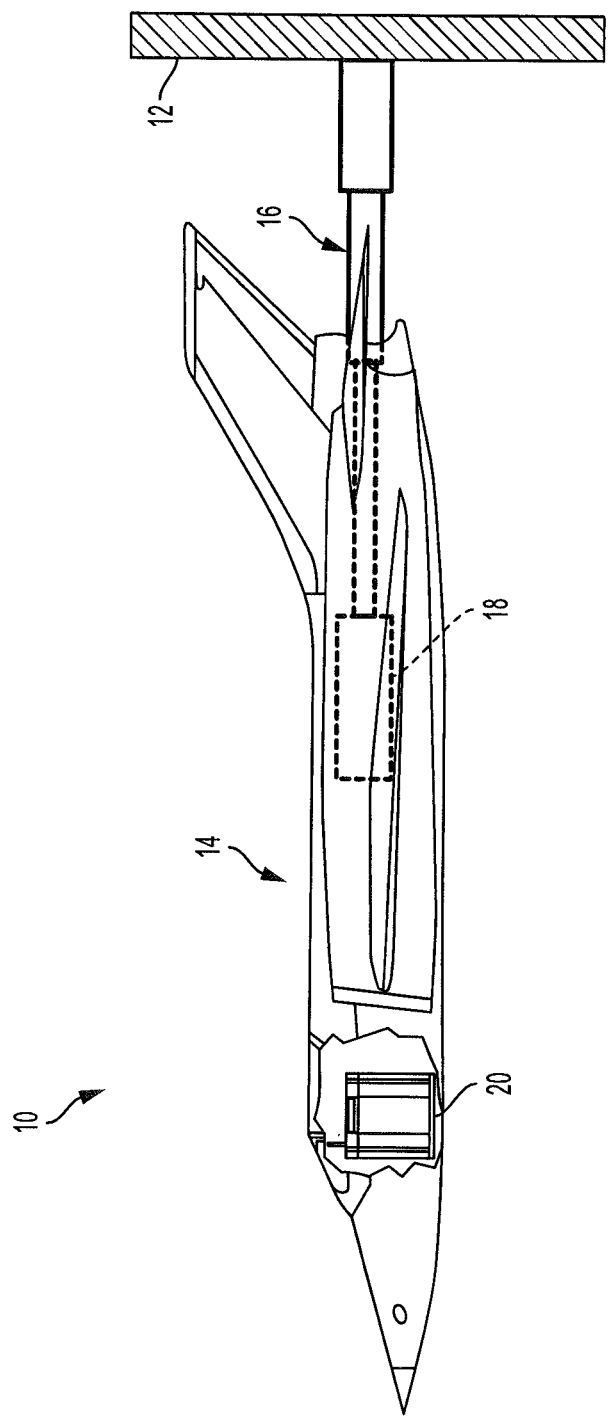
FIG. 1 is a semi-transparent side elevational view of a wind tunnel testing system depicting a mass-damping apparatus disposed within an airplane model.

This example describes an illustrative wind tunnel testing system, see FIG. 1.

FIG. 1 is a semi-transparent side elevational view of an exemplary wind tunnel testing system, generally indicated at 10. Wind tunnel testing system 10 may include a wind tunnel chamber, a portion of which is indicated at 12, a model 14, a support structure 16 for the model, an internal balance 18, and a tunable mass-damping apparatus 20. The mass-damping apparatus 20 may be used to decrease vibrations of model 14 and/or the support structure 16 that supports the model during wind tunnel testing of the model. Mass-damping apparatus 20 may be coupled to the model, for example, with screws, bolts, adhesives, press fitting, or by any other suitable means.

Model 14 may be connected to the internal balance 18, which may be the primary measurement device used in wind tunnel testing to determine the motions of the model as a function of time. The internal balance may be connected to support structure 16 which supports the model during testing. In some cases, the natural vibrational frequencies of model 14 and/or support structure 16 may be known exactly or nearly exactly, and mass-damping apparatus 20 may be pre-configured or tuned to dampen least some of the associated vibrations. In other cases, the natural frequencies of the system may be unknown or known only approximately, in which case it may be desirable to adjust or "tune" the mass damper during aerodynamic testing, until it damps vibrations at one or more desired frequencies. This can be accomplished by adjusting various parameters of the mass damper, as described in more detail below.

In any event, when mass damper 20 is adjusted to reduce or prevent vibrations of model 14 that arise from the coupling of the model with support structure 16, this allows internal balance 18 to measure only (or primarily) vibrations associated with the actual aerodynamic performance of the model, thus improving the accuracy and utility of the wind tunnel testing.

Example 2

Figure 2:
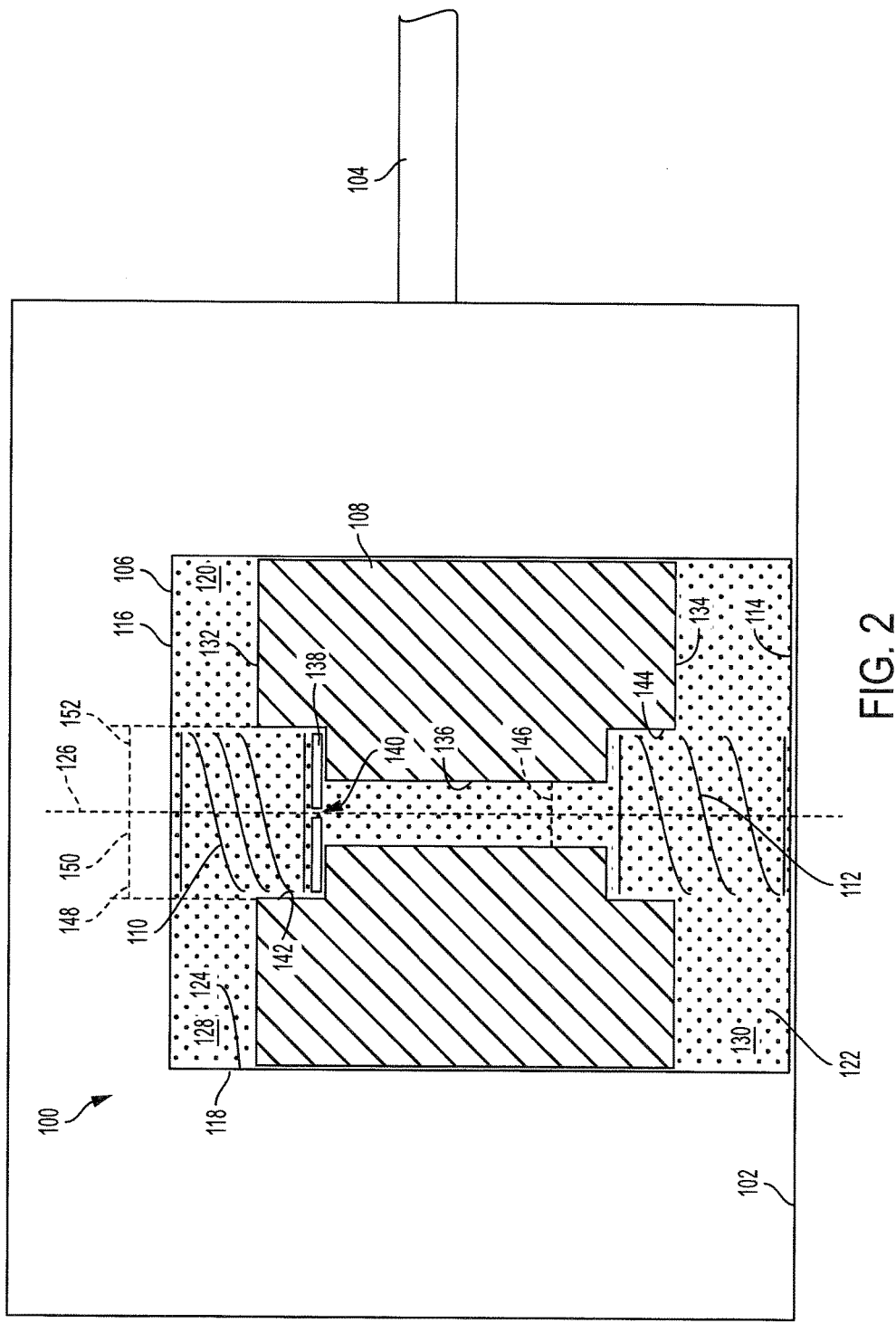
FIG. 2 is a schematic illustration of a tunable mass-damping apparatus.

This example describes an illustrative tunable mass-damping apparatus, see FIG. 2.

FIG. 2 is a schematic illustration of a tunable mass-damping apparatus, generally indicated at 100, illustrating some of the basic features and elements of a mass damper. Mass damper 100 may be coupled to a wind tunnel model 102 which may, in turn, be supported by a support structure 104 during wind tunnel testing of the model.

Mass-damping apparatus 100 may include a housing 106, a mass 108, and at least one spring, for example an upper spring 110 and a lower spring 112. The housing 106 may have a mounting base 114, a cap 116, and walls 118 extending from the mounting base to the cap. The mounting base, cap, and walls of the housing may define an interior volume 120 containing a gas 122, such as air, or any other compressible gas or fluid. The term "atmospheric air" may sometimes be used in this disclosure to indicate ordinary air taken from the environment.

The walls 118 of the housing 106 may have an interior surface 124. The interior surface 124 of the walls may be cylindrical. Housing 106 may have an axis 126 which may extend from a center of the mounting base 114 to a center of the cap 116. A cross-section of the interior surface of the walls, taken in a plane perpendicular to axis 126, may be circular, though other shapes are also possible. Whatever the cross-sectional shape of the interior surface of the walls happens to be, this cross-sectional shape may be consistent along axis 126 for at least a portion of the interior surface.

Housing 106 may be configured to be coupled to the wind tunnel model 102. For example, the mounting base 114 of the housing may be configured to couple the housing to the wind tunnel model via screws, bolts, or any other appropriate means.

Mass 108 may be configured to move back and forth in the interior volume 120 of the housing along the axis 126. The mass may have a weight in a range of 0.5 to 10 percent of a weight of the wind tunnel model 102. Mass 108 may be configured to make an airtight seal with the interior surface 124 of the housing, thereby dividing the interior volume into an upper chamber 128 and a lower chamber 130. The cylindrical portion of the interior surface may be disposed between the upper and lower chambers.

Mass-damping apparatus 100 may include only upper spring 110, only lower spring 112, or both the upper spring and the lower spring. One or both of the upper and lower springs may be configured to exert a position-dependent force upon the mass 108. Either or both of the springs may be characterized by a spring constant or an effective spring constant chosen based on a natural frequency of the support structure 104 of the wind tunnel model 102.

The upper spring may be configured to exert a force upon an upper side 132 of the mass and the lower spring may be configured to exert a force upon a lower side 134 of the mass. The upper side may be substantially opposite the lower side of the mass. In other embodiments, a mass damper may include only one or more alternative elements configured to exert position-dependent forces upon mass 108, such as elastomers, struts, or the like.

Mass-damping apparatus 100 may include a passage 136 through the mass 108 fluidly connecting the upper chamber 128 and the lower chamber 130. Passage 136 may allow gas 122 to pass between the two chambers, thereby altering the pressure in each chamber. For example, if the pressure of gas 122 in the upper chamber were higher than the pressure of the gas in the lower chamber, perhaps as a result of a vertical movement of mass 108, then gas may flow from the upper chamber to the lower chamber through passage 136 thereby lowering the pressure in the upper chamber and raising the pressure in the lower chamber.

Mass-damping apparatus 100 may include a set or removable orifice plates, one of which is indicated at 138. Each of the set of orifice plates may be configured to restrict the flow of gas through the passage 136 as the mass 108 moves. Each of the set of orifice plates may include a differently sized orifice 140. The different orifice plates may thus provide different levels of restriction to the flow of gas through the passage. To change orifice plates, apparatus 100 may be slightly dismantled, perhaps by removing cap 116 and upper spring 110, and a first orifice plate having a first orifice of a first size replaced with a second orifice plate having a second orifice of a second size different than the first size.

Mass 108 may include an upper bore 142 which may fluidly connect the upper chamber 128 and the passage 136. Mass 108 may include a lower bore 144 which may fluidly connect the lower chamber 130 and the passage 136. The upper spring 110 may be seated in upper bore 142. The lower spring 112 may be seated in lower bore 144.

The orifice plate 138 may be configured to be seated in upper bore 142 or lower bore 144, though upper bore 142 may be more convenient for changing orifice plates. The orifice plate may be configured to be held in place the bore by a spring, for example in upper bore 142 by upper spring 110. In order for the spring to securely hold the orifice plate in place in the bore, the spring, orifice plate, bore, and passage may be appropriately sized. For example, passage 136 may have a first lateral dimension 146, upper bore 142 may have a second lateral dimension 148 greater than the first lateral dimension 146, each of the orifice plates 138 may have a third lateral dimension 150 substantially the same as the second lateral dimension 148, and the upper spring 110 may have a fourth lateral dimension 152 substantially the same as the second lateral dimension 148. Thus the orifice plate 138 may sit in the upper bore so that lateral motion of the orifice plate is constrained by the upper bore itself and axial motion of the orifice plate is constrained by the upper spring.

In the absence of any damping forces, once set in motion mass 108 would oscillate between upper and lower chambers 128 and 130 indefinitely at its natural frequency, in an example of undamped motion. However, the passage of air through passage 136 and orifice plate 138 may provide a variable, velocity-dependent damping force, causing the oscillations of mass 108 to decay or in some cases even preventing oscillations.

In other words, mass damper 100 can be configured to cause mass 108 to undergo underdamped motion (where in the absence of additional forces, the mass would undergo more than one oscillation before coming to rest), critically damped motion (where in the absence of additional forces, the mass would return to equilibrium as quickly as possible without oscillating), or overdamped motion (where in the absence of additional forces, the mass would return to equilibrium without oscillating, but in a longer time than if critically damped). The characterization and mathematical treatment of these various types of damped oscillations are well known and will not be described in further detail in this disclosure.

The natural frequency of apparatus 100 can be adjusted by changing the mass and/or changing the springs (i.e., changing the effective spring constant). In addition, for a given natural frequency, the degree to which oscillations of the mass are damped can be adjusted by regulating the rate of flow through the passage connecting the upper and lower chambers, which changes the damping force. In particular, adjustment of the size of the orifice by changing orifice plates may change the pressure-induced damping forces and thereby allow convenient control over the amount of damping provided by mass damper 100. Each of the differently-sized orifices of the orifice plate may be sized small than the first lateral dimension of the passage.

Example 3

Figure 3:
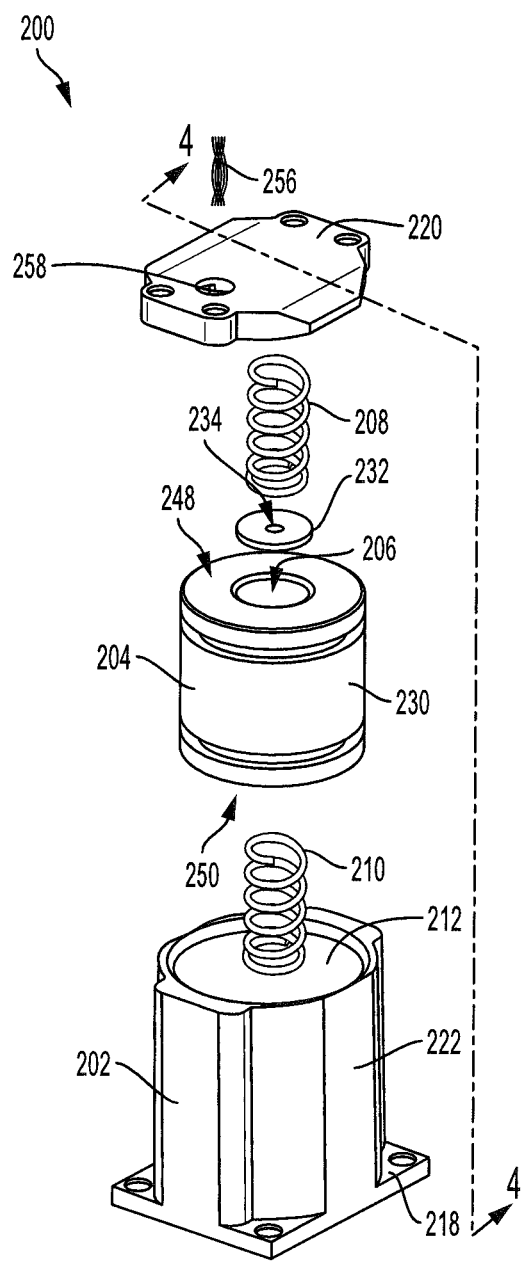
FIG. 3 is an exploded view depicting an embodiment of a tunable mass-damping apparatus.
Figure 4:
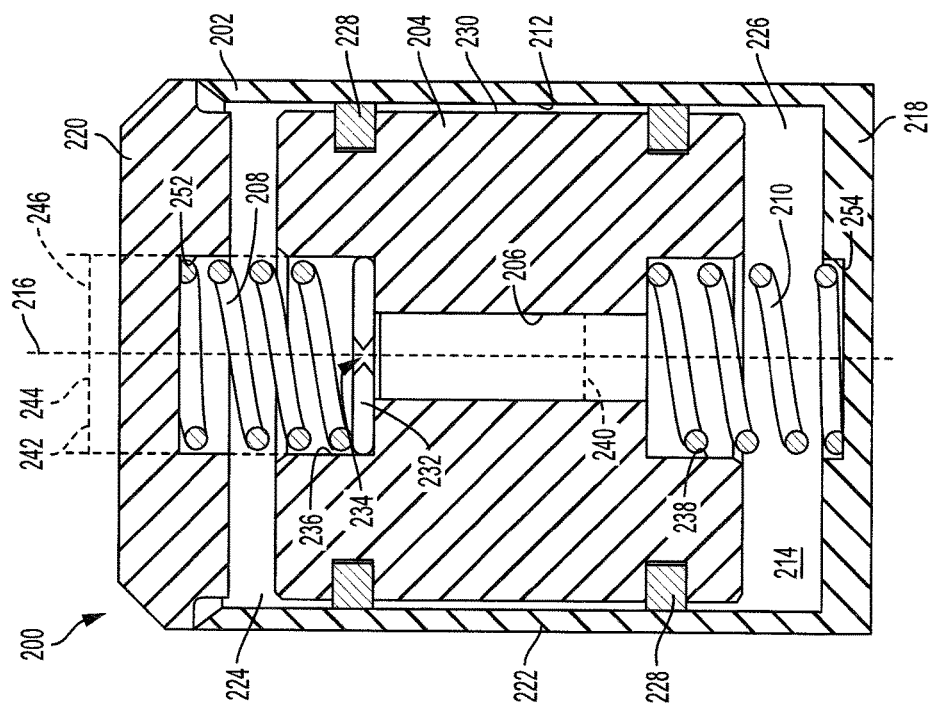
FIG. 4 shows an unexploded cross-sectional view of the embodiment of the tunable mass-damping apparatus of FIG. 3, taken at plane 4-4 in FIG. 3.

This example describes an embodiment of a tunable mass-damping apparatus, see FIGS. 3-4.

FIG. 3 is an exploded isometric view, and FIG. 4 is an assembled sectional view taken through the plane 4-4 in FIG. 3, depicting an embodiment of a mass-damping apparatus or mass damper, generally indicated at 200. Mass-damping apparatus 200 may include a housing 202, a mass 204, a passage 206 through the mass, an upper spring 208, and a lower spring 210.

Housing 202 may have an interior surface 212, an interior volume 214 containing a gas, such as atmospheric air, and an axis 216 as shown in FIG. 4. The interior surface of the housing may be cylindrical, though other cross-sectional shapes are also possible. The housing may be configured to be coupled to a wind tunnel model. For example, the housing may include a mounting base 218 configured to couple the housing to the wind tunnel model. Housing 202 may include a cap 220 and side walls 222 extending between the mounting base and the cap.

Mass 204 may be configured to move back and forth in the interior volume 214 along the axis 216. The mass may be configured to make an airtight seal with the interior surface 212 of the housing, thereby dividing the interior volume of the housing into an upper chamber 224 and a lower chamber 226. While mass damper 200, and particularly the interior surface 212 and mass 204, are depicted in FIGS. 3-4 as substantially cylindrical in shape, more generally a mass damper according to the present teachings may have any desired shape configured to allow a central mass to move back and forth between two chambers. Similarly, the central mass may have any desired shape that can fit within a portion of the mass damper in a substantially airtight manner. For example, a spherical mass might be used within a cylindrical housing.

Mass 204 may make an airtight seal with the interior surface of the housing via one or more sealing members. For example, two sealing members 228 in the form of rings may be disposed around an outer edge 230 of the mass and may make contact with the interior surface 212 of the housing. The sealing members may be made of Teflon, rubber, or any other suitable material. It is also possible for the mass to fit within the interior surface in a substantially airtight manner without sealing members, and any of the embodiments shown and described by the present teachings may or may not incorporate a set of sealing members in order to maintain an airtight seal.

Mass damper 200 may be configured so that mass 204 can be conveniently adjusted, either by adding additional sections of mass to an existing section, or by allowing replacement of the mass and selecting a mass with a desired density or weight. In some cases, mass 204 may be chosen to have a weight which is some desired fraction or percent of the weight of the wind tunnel model to be tested. For example, mass 204 may be chosen to have a weight in the range of 0.5%-10% of the weight of the wind tunnel model, or more specifically in the range of 1%-3% of the weight of the wind tunnel model.

Passage 206 through the mass 204 may fluidly connect the upper chamber 224 and the lower chamber 226, thereby allowing air of some other working fluid to pass between the chambers. Apparatus 200 may further include a set of removable or interchangeable orifice plates, one of which is indicated at 232, operatively coupled to the mass 204. Each orifice plate may include a differently-sized orifice 234, thereby configuring the orifice plate to restrict the flow of gas through the passage as the mass moves. The orifice plate may be configured to be seated in a bore in the mass, the bore fluidly connecting the passage and one of the upper and lower chambers. For example, orifice plate 232 may be seated in an upper bore 236 in the mass, the upper bore fluidly connecting the passage 206 and the upper chamber 224. Alternately, the orifice plate 232 may be seated in a lower bore 238 in the mass, the lower bore fluidly connecting the passage 206 and the lower chamber 226.

The orifice plate 232 may be configured to be held in place in the bore by a spring, for example, in upper bore 236 by upper spring 208. In order for the upper spring to securely hold the orifice plate in place in the upper bore, the upper spring, orifice plate, upper bore, and passage 206 may be appropriately sized. For example, passage 206 may have a first lateral dimension 240, upper bore 236 may have a second lateral dimension 242 greater than the first lateral dimension 240, each of the orifice plates 232 may have a third lateral dimension 244 substantially the same as the second lateral dimension 242, and the upper spring 208 may have a fourth lateral dimension 246 substantially the same as the second lateral dimension 242. Thus the orifice plate 232 may sit in the upper bore so that lateral motion of the orifice plate is constrained by the upper bore itself and axial motion of the orifice plate is constrained by the upper spring.

Orifice plate 232 may provide a degree of damping for the motions of mass 204. As each of the orifice plates may have a differently-sized orifice, each of the orifice plates may provide a different degree of damping for the motions of the mass. That is, a damping force may be applied to the mass as it moves along the axis, and that damping force may be altered by removing one orifice plate and replacing it with another orifice plate having a differently-sized orifice. Each of the differently-sized orifices of the orifice plates may be smaller than the first lateral dimension 240 of the passage 206.

Upper spring 208 may be configured to exert a position-dependent force upon the mass 204. Lower spring 210 may be configured to exert a position-dependent force upon the mass 204. One or both of the springs may be characterized by a spring constant or effective spring constant chosen based on a natural frequency of a support structure of the wind tunnel model. Upper spring 208 may be configured to exert a force upon an upper side 248 of the mass and lower spring 210 may be configured to exert a force on a lower side 250 of the mass substantially opposite the upper side. Upper bore 236 may be considered to be an indentation in the upper side 248 of the mass. Lower bore 238 may be considered to be an indentation in the lower side 250 of the mass. Upper spring 208 may be seated in the upper bore and lower spring 210 may be seated in the lower bore.

Upper and lower springs 208 and 210 may exert forces upon mass 204 which are proportional to their compression or stretch relative to some equilibrium position. In other embodiments, non-linear springs or alternative force providing elements such as spring-like elastomers may be provided, and in some cases only a single spring or alternative element may be used.

In the embodiment of FIGS. 3-4, a pair of cylindrical indents, 252 and 254, are formed on inside surfaces of the cap 220 and mounting base 218, respectively. The indents may maintain the correct position and alignment of springs 208, 210 and also facilitate replacement of the springs, for instance for purposes of routine maintenance or when a different spring constant is desired. In other embodiments, the springs or alternative force providing elements may be aligned or retained by different methods, such as by adhesion to the mass and/or the interior of the mass damper.

Mass damping apparatus 200 may include a position sensor 256. Position sensor 256 may be configured to measure a sequence of positions of mass 204 as it oscillates. Such measurements may allow a user to determine oscillations characteristics of the mass damper, such as an oscillation frequency or a damping time. Position sensor 256 may pass through a position sensor port 258 on the cap 220 of the mass damper in a substantially airtight manner. Thus may the position sensor be able to "see" the mass inside the damper and communicate measurements to a user outside the damper. The position sensor may include an infrared light and a photodiode detector. Alternately, position sensor may include components to send and detect sound waves. Any suitable position sensor may be used.

As described previously with respect to the schematic depiction of a mass damper in FIG. 2, mass damper 200 of FIGS. 3-4 can provide a desired degree of damping to the motion of mass 204. Specifically, by adjusting the amount of the mass, the spring constant or effective spring constant of the springs, and/or the rate of flow through the passage connecting the upper and lower chambers, mass 204 may be configured to oscillate at any desired frequency, and the motion of mass 204 can be underdamped, critically damped, or overdamped. Typically, but not always, it may be desirable to achieve critical damping corresponding to a particular natural frequency of vibration, which can be obtained through the appropriate selection of mass and springs. Any adjustments to the amount of damping can then be made by adjusting the flow through passage 206 with orifice plates 232.

Example 4

Figure 5:
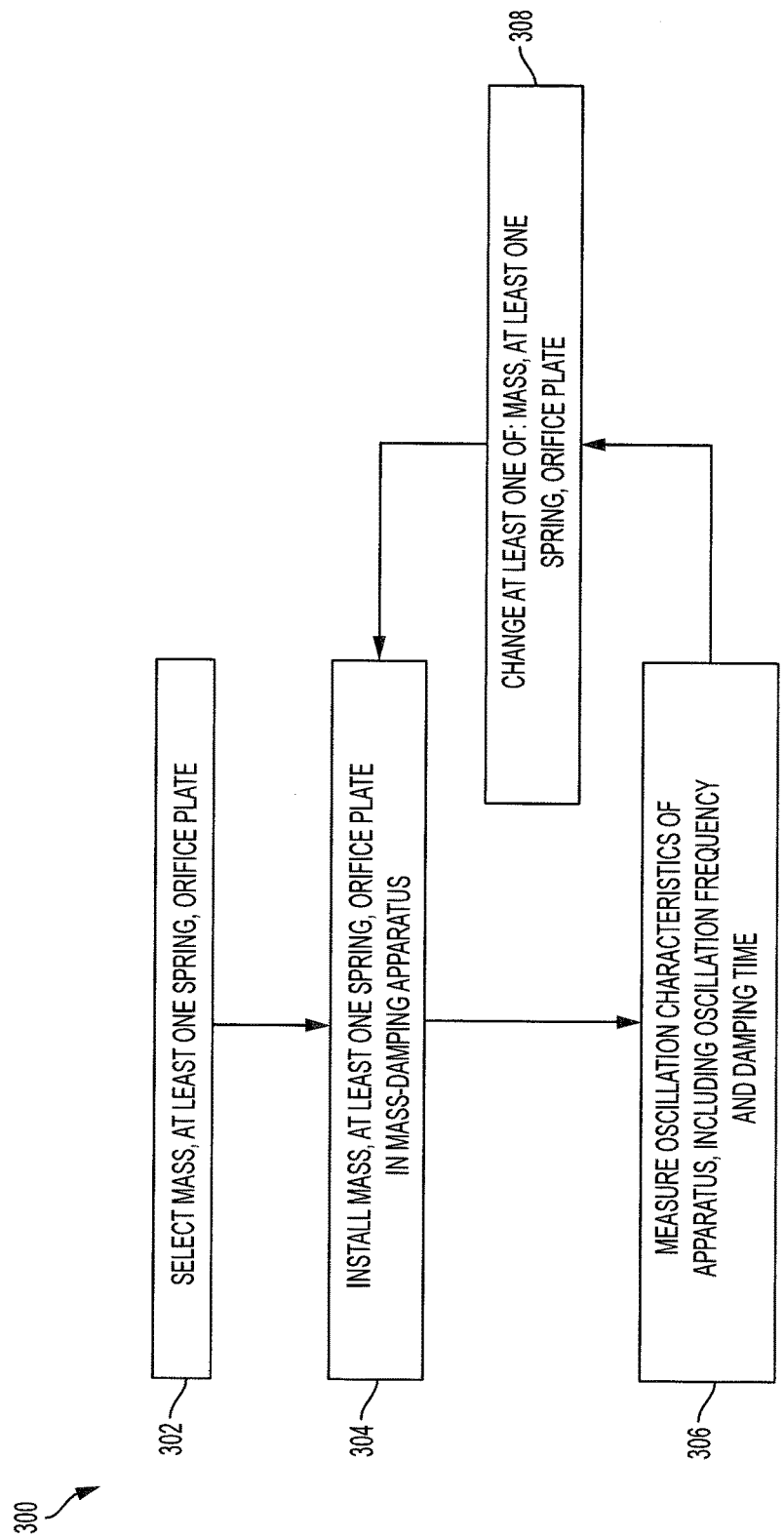
FIG. 5 is a flow chart depicting a method of calibrating a tunable mass-damping apparatus.

This example describes an illustrative method of calibrating a tunable mass-damping apparatus to reduce dynamic forces on a wind tunnel model during wind tunnel testing, which may be used in conjunction with any of the apparatuses described herein; see FIG. 5.

FIG. 5 depicts multiple steps of a method, generally indicated at 300 of calibrating a tunable mass-damping apparatus to reduce dynamic forces on a wind tunnel model during wind tunnel testing. Method 300 may be used in conjunction with any of the mass-damping apparatuses depicted in and described in reference to FIGS. 1-4. Although various steps of method 300 are described below and depicted in FIG. 5, the steps need not necessarily all be performed, and in some cases may be performed in a different order than the order shown.

Method 300 may include a step 302 of selecting a mass, at least one spring, and an orifice plate. Any suitable mass may be selected, and there may be a variety of selection criteria that determine which mass is chosen, with the ultimate goal of matching the natural frequency of the mass when used in a mass damper to a natural frequency of vibration resulting from the coupling of a model to a support structure. One possible choice is to select a mass with a weight based on or equal to a predetermined percentage of weight of a wind tunnel model. For example, the predetermined percentage may be in the range of 0.5 to 10 percent of the weight of the wind tunnel model, though other ranges may be chosen as well. Another possible choice is to choose the largest mass possible within the constraint that the mass damper, including the selected mass, must fit within the available space within the wind tunnel model.

The selected spring may have a spring constant chosen based on a natural frequency to be damped, in combination with the mass selected. For example, the spring constant may be chosen so that a mass damper constructed from the chosen mass and spring(s) will match a natural frequency of a support structure for the wind tunnel model, and thereby reduce vibrations of the wind tunnel model at that frequency. Selecting at least one spring may include selecting at least two springs, or any number of desired springs. When more than one spring is selected, the springs may collectively have an effective spring constant that is chosen based on one or more natural frequencies, as described above in the case of one spring.

The selected orifice plate may provide a degree of damping of the motions of the mass when installed with the selected mass in a mass damper. The orifice plate may be selected from a set of orifice plates, each having the same general size and shape with the exception that each orifice plate may have a differently sized orifice, or set or orifices, passing through each orifice plate.

Method 300 may include a step 304 of installing the mass, the at least one spring, and the orifice plate in a mass-damping apparatus. The mass-damping apparatus may be of the general type shown in FIGS. 1-4 and discussed previously. That is, the mass-damping apparatus may allow the mass to move back and forth between upper and lower gas-filled chambers while the at least one spring exerts a position-dependent forces upon the mass. As the mass moves, gas may pass between the chambers serially though the orifice plate and a passage through the mass which fluidly connects the chambers. For example, as gas moves from the upper chamber to the lower chamber, the gas may first pass through the orifice plate and then through the passage. The gas may be atmospheric air.

The mass-damping apparatus may include a housing that defines the upper and lower gas-filled chambers. The housing may include a cylindrical central portion between the upper and lower gas-filled chambers for receiving the mass. The mass may be received in the central portion in a substantially airtight manner. The housing may include a mounting base configured to couple the housing to the wind tunnel model. For example, the mounting base could be attached to the model by screws, bolts, or other similar fastening hardware, although many other attachment means such as adhesive attachment are also possible.

Method 300 may include a step 306 of measuring oscillation characteristics of the assembled mass-damping apparatus, including an oscillation frequency of the mass and a characteristic damping time of the mass. Measuring the oscillation characteristics of the apparatus may include exciting oscillations of the mass and measuring a sequence of subsequent positions of the mass as the mass exhibits undriven, damped oscillation. The mass-damping apparatus may include a position sensor for this purpose.

The oscillation frequency of the mass may be determined by the amount of the selected mass, the spring constant or effective spring constant of the at least one spring, and the damping force provided by the selected orifice plate.

The characteristic damping time of the mass may be the amount of time required for the mass to return to an equilibrium position after being displaced a distance from that equilibrium position. Alternately, in the case where the mass exhibits underdamped oscillation, the characteristic damping time may be the amount of time required for the amplitude of the oscillation to reach a predetermined fraction of the initial oscillation amplitude. The characteristic damping time may be a function of the damping force provided by the selected orifice plate.

Step 306 may be performed in a laboratory setting instead of a wind tunnel. Thus may the properties of the mass-damping apparatus be studied and determined without confounding effects of a wind tunnel model or a wind tunnel model support structure. Once the oscillation characteristics of the assembled apparatus are determined, the apparatus may be installed in a wind tunnel model supported by a support structure.

Method 300 may include a step 308 of selecting a new at least one of the mass, the at least one spring, and the orifice plate. That is, the selected mass described above may be a first mass and method 300 may include selecting a second mass. The second mass may have a different mass as measured in kilograms than the first mass. The second mass may be sized to fit within the same mass-damping apparatus as the first mass or may be sized to fit within a different mass-damping apparatus. Changing only the mass in the mass-damping apparatus may change the oscillation frequency of the apparatus.

The at least one spring described above may be a first at least one spring and method 300 may include selecting a second at least one spring. The second at least one spring may have a different spring constant or effective spring constant that the first at least one spring. Changing only the at least one spring in the mass-damping apparatus may change the oscillation frequency of the apparatus.

The selected orifice plate described above may be a first orifice plate having a first orifice of a first size, and method 300 may include selecting a second orifice plate having a second orifice of a second size different that the first size. The second orifice plate may provide a different degree of damping than the first orifice plate. Changing only the orifice plate in the mass-damping apparatus may change the oscillation frequency and the damping time of the apparatus.

Method steps 304, 306, and 308 may be part of a feedback loop. That is, once a new at least one of the mass, spring(s), or orifice plate has been selected, method 300 may return to step 304 where the new mass, spring(s), or orifice plate is installed in a mass-damping apparatus and on to step 306 where the new oscillation characteristics of the newly assembled apparatus are measured. For example, method 300 may include replacing the first orifice plate with the second orifice plate in the mass-damping apparatus and measuring oscillation characteristics of the mass-damping apparatus including the second orifice plate.

A catalog of mass-damping apparatuses and their oscillation characteristics may thus be created. When a wind tunnel test of a model aircraft is to be performed, the optimal oscillation and damping characteristics of a mass-damping apparatus may be determined and the appropriate configuration of mass, spring(s), and orifice plates may be selected so as to reduce dynamic forces on the model, perhaps due to vibrations which originate from the support structure of the model.

Installing the selected components of the mass-damping apparatus and installing the apparatus within the wind tunnel model may be time consuming. By determining the required oscillation and damping characteristics beforehand, instead of adjusting parameters once the apparatus has been installed in the wind tunnel, valuable time in the wind tunnel may be saved.

Example 5

Figure 6:
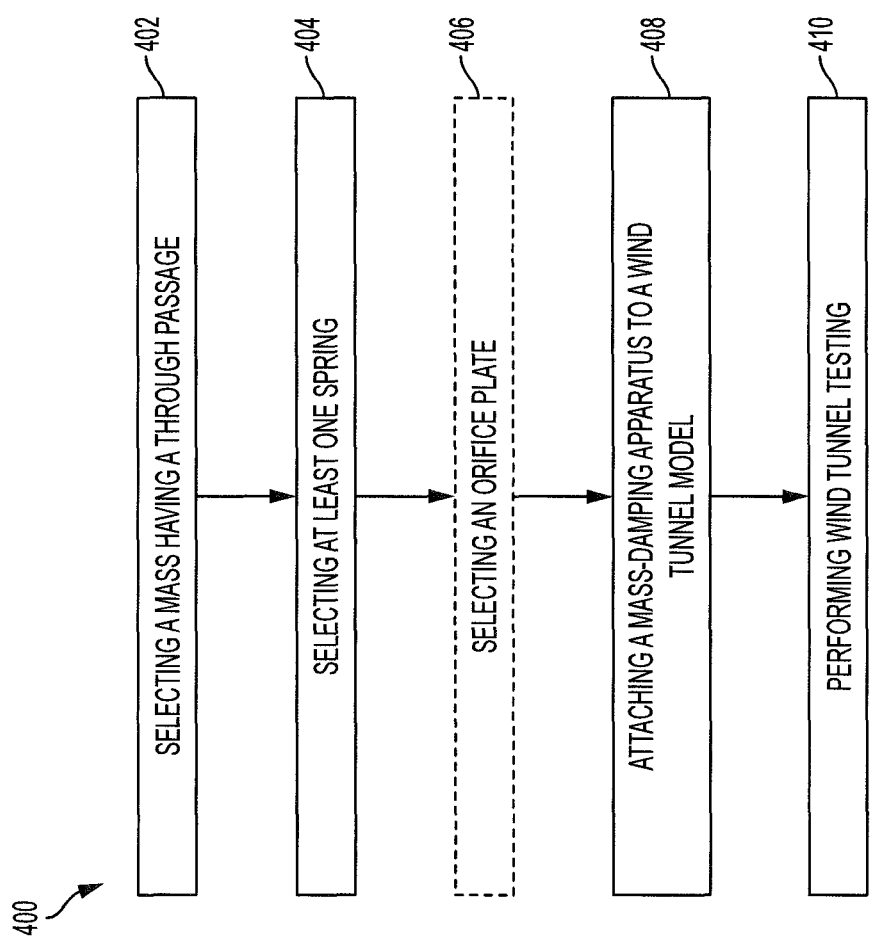
FIG. 6 is a flow chart depicting a method of reducing dynamic forces on a wind tunnel model during wind tunnel testing.

This example describes an illustrative method of reducing dynamic forces on a wind tunnel model during wind tunnel testing, which may be used in conjunction with any of the apparatuses described herein; see FIG. 6.

FIG. 6 depicts multiple steps of a method, generally indicated at 400 of reducing dynamic forces on a wind tunnel model during wind tunnel testing. Method 400 may be used in conjunction with any of the mass-damping apparatuses depicted in and described in reference to FIGS. 1-4. Although various steps of method 400 are described below and depicted in FIG. 6, the steps need not necessarily all be performed, and in some cases may be performed in a different order than the order shown.

Method 400 may include a step 402 of selecting a mass having a through passage. Any suitable mass may be selected, and there may be a variety of selection criteria that determine which mass is chosen, with the ultimate goal of matching the natural frequency of the mass when used in a mass damper to a natural frequency of vibration resulting from the coupling of a model to a support structure. One possible choice is to select a mass with a weight based on or equal to a predetermined percentage of weight of a wind tunnel model. For example, the predetermined percentage may be in the range of 0.5 to 10 percent of the weight of the wind tunnel model, though other ranges may be chosen as well. Another possible choice is to choose the largest mass possible within the constraint that the mass damper, including the selected mass, must fit within the available space within the wind tunnel model. The mass may include a through passage, such as passage 136 described in reference to FIG. 2, configured to allow the flow of gas from one pressure chamber to another pressure chamber once the mass has been installed in a mass-damping apparatus.

Method 400 may include a step 404 of selecting at least one spring. A spring constant of the at least one spring may be chosen based on a natural frequency of a support structure for the wind tunnel model. For example, the spring constant may be chosen so that a mass damper constructed from the chosen mass and spring(s) will match a natural frequency of a support structure for the wind tunnel model, and thereby reduce vibrations of the wind tunnel model at that frequency. Selecting at least one spring may include selecting at least two springs, or any number of desired springs. When more than one spring is selected, the springs may collectively have an effective spring constant that is chosen based on one or more natural frequencies of the support structure, as described above in the case of one spring.

Method 400 may include a step 408 of attaching a mass-damping apparatus to a wind tunnel model. The mass-damping apparatus may be of the general type shown in FIGS. 1-4 and described previously. Accordingly, the mass-damping apparatus may include a housing having an interior surface, an interior volume containing a gas, and an axis. As described previously, the gas may be atmospheric air or any other suitable gas or fluid. The mass-damping apparatus may include the selected mass and the selected at least one spring. The interior surface of the housing may be cylindrical and may be configured to receive the mass. The housing may include a mounting base configured to couple the housing to the wind tunnel model.

The selected mass may be configured to move back and forth in the interior volume along the axis. The mass may be configured to make an airtight seal with the interior surface of the housing, thereby dividing the interior volume into an upper chamber and a lower chamber. The passage through the mass may fluidly connect the chambers.

Also as described previously, as the mass moves back and forth, the springs or other force-providing elements may be configured to exert a position-dependent force upon the mass, directed towards an equilibrium position of the mass and increasing in magnitude as the mass moves farther away from its equilibrium position.

Method 400 may include a step 410 of performing wind tunnel testing upon the model. Wind tunnel testing will typically include mounting the model on a support structure and directing air flow over the model. The model may be outfitted with a suite of instruments designed to measure, for example, forces on the model during testing. Some of these forces may come from the aerodynamic performance of the model and some may come from the support structure that is holding the model. These latter forces are an artifact of the test and would not be present during real-life operation. Hence, reducing the forces caused by vibrations of the support structure would improve the accuracy of the test. If these forces were too large they could even pose a danger to the model. Reducing them would allow the model to be tested under a greater range of conditions.

It is possible at steps 402 and 404 to select a mass and one or more springs so that the mass-damping apparatus has a natural vibration frequency in common with the support structure, or with the combination of the support structure and the model. Since the support structure is attached to the model, and the model is attached to the mass-damping apparatus at step 408, vibrations of the support structure may be transferred to the mass-damping apparatus instead of the model. Thus, tuning the mass-damping apparatus to the natural frequency of the support structure by appropriate selection of a mass and an effective spring constant reduces undesirable artifact forces on the model during testing.

Method 400 may optionally include a step 406 of selecting an orifice plate. The selected orifice plate may be included with the mass-damping apparatus in order to restrict the flow of gas through the passage as the mass moves. The orifice plate may be selected from a set of orifice plates, where each orifice plate includes a differently-sized orifice so as to provide a determined degree of damping of the motions of the mass. The degree of damping provided by each orifice plate may be determined by a calibration procedure, such as is shown and described in reference to FIG. 5.

The selected orifice plate may be configured to be seated in a bore or indentation in the mass. The bore may fluidly connect the passage and one of the upper and lower chambers. The orifice plate may be held in place in the bore by a spring of the at least one springs.

A mass-damping apparatus according to the present teachings is thus tunable both in the sense that different masses and springs may be chosen to change the natural vibrational frequency of the mass-damping apparatus, and in the sense that the damping force can be conveniently adjusted to change the rate at which the mass damper reduces undesirable vibrations.

Example 6

Figure 7:
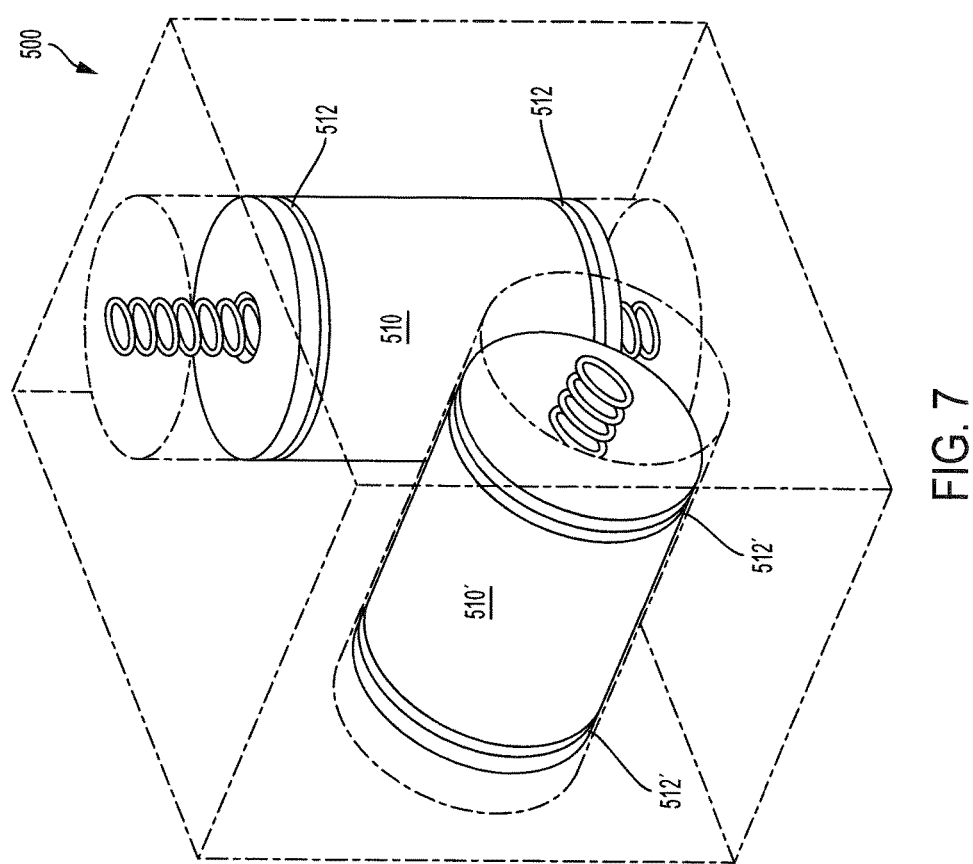
FIG. 7 is a schematic illustration of a multi-directional tunable mass-damping apparatus.

This example describes an embodiment of a multi-directional tunable mass-damping apparatus, see FIG. 7.

FIG. 7 is a schematic illustration of a multi-directional tunable mass-damping apparatus, generally indicated at 500. Such an apparatus may be useful because the natural vibration frequencies of a wind tunnel model support structure, the model, or the support structure together with the model may be different in different directions. Further, a uni-directional mass-damping apparatus as described previously may have difficulty absorbing energy from side-to-side vibrations if the apparatus itself is oriented vertically. Apparatus 500 thus incorporates two mass dampers of the type described above, one oriented in a vertical direction as indicated at 510, and one oriented in a horizontal direction as indicated at 510'.

The two mass dampers incorporated into mass-damping apparatus 500 need not be identical. Indeed, the two dampers may be tuned or calibrated independently as described in reference to FIGS. 5 and 6 to absorb energy at different frequencies and/or to dissipate the absorbed energies at different rates, thus further reducing dynamic forces on the model during testing. The two dampers may be oriented perpendicularly to each other, as depicted in FIG. 7, or at any other desired angle with respect to each other. In addition, the dampers may be oriented at any angle with respect to the model. In some cases, three dampers may be used to provide damping along three axes.

The individual mass dampers 510 and 510' each have a set of sealing members 512 and 512' disposed around the outer edges of the oscillating masses and making contact with the cylindrical central portions. The sealing members help to maintain an airtight seal between each mass and the surrounding cylinder as the masses move back and forth. It is also possible for masses to fit within a cylinder in a substantially airtight manner without sealing members, and any of the embodiments shown and described by the present teachings may or may not incorporate a set of sealing members in order to maintain an airtight seal. The sealing members may, for example, be rings made of Teflon, rubber, or any other suitable material. There may be one, two, or more than two sealing members disposed around the mass.

In the previous descriptions and drawings the use of terms such as "upper," "lower," "top," "bottom," "first," and "second" are meant to aid in the descriptions of the drawings and are not to be taken to be limiting in any sense, or to imply that the mass-damping apparatus can only be used in a vertical orientation. The embodiments of the mass-damping apparatus shown are illustrative of the principles of the invention and could be altered by a person with knowledge of the art.

Example 7

This section describes additional aspects and features of embodiments, presented without limitation as a series of paragraphs, some or all of which may be alphanumerically designated for clarity and efficiency. Each of these paragraphs can be combined with one or more other paragraphs, and/or with disclosure from elsewhere in this application in any suitable manner. Some of the paragraphs below expressly refer to and further limit other paragraphs, providing without limitation examples of some of the suitable combinations.

A1. A tunable mass-damping apparatus, comprising:
a housing having an interior surface, an interior volume containing a gas, and an axis, the housing configured to be coupled to a wind tunnel model;
a mass configured to move back and forth in the interior volume along the axis, the mass configured to make an airtight seal with the interior surface of the housing, thereby dividing the interior volume into an upper chamber and a lower chamber;
a passage through the mass fluidly connecting the chambers; and
at least one spring configured to exert a position-dependent force upon the mass;
wherein the spring is characterized by a spring constant chosen based on a natural frequency of a support structure of the wind tunnel model.

A2. The apparatus of paragraph A1, further comprising a set of removable orifice plates, wherein each orifice plate includes a differently-sized orifice, and each orifice plate is configured to (a) be seated in a bore in the mass, the bore fluidly connecting the passage and one of the upper and lower chambers, (b) be held in place in the bore by a spring of the at least one springs, and (c) restrict the flow of gas through the passage as the mass moves.

A3. The apparatus of paragraph A2, wherein the passage has a first lateral dimension, the bore has a second lateral dimension greater than the first lateral dimension, each of the set of orifice plates has a third lateral dimension substantially the same as the second lateral dimension, and the differently-sized orifices of the orifice plates are all sized smaller than the first lateral dimension.

A4. The apparatus of paragraph A1, wherein the gas is atmospheric air.

A5. The apparatus of paragraph A1, wherein the at least one spring includes an upper spring configured to exert a force upon an upper side of the mass and a lower spring configured to exert a force on a lower side of the mass substantially opposite the upper side.

A6. The apparatus of paragraph A5, wherein the upper spring is seated in an upper bore of the mass and the lower spring is seated in a lower bore of the mass, the upper bore fluidly connected to the upper chamber and the passage and the lower bore fluidly connected to the lower chamber and the passage.

A7. The apparatus of paragraph A1, wherein the mass has a weight in a range of 0.5 to 10 percent of a weight of the wind tunnel model.

A8. The apparatus of paragraph A1, wherein the interior surface of the housing is cylindrical and the housing includes a mounting base configured to couple the housing to the wind tunnel model.

B1. A method of calibrating a tunable mass-damping apparatus to reduce dynamic forces on a wind tunnel model during wind tunnel testing, comprising:
selecting a mass with weight equal to a predetermined percentage of weight of the wind tunnel model;
selecting at least one spring with a spring constant chosen to reduce vibrations of the wind tunnel model at a natural frequency of a support structure for the wind tunnel model;
selecting an orifice plate to provide a degree of damping of motions of the mass;
installing the mass, the at least one spring, and the orifice plate in a mass-damping apparatus that allows the mass to move back and forth between upper and lower gas-filled chambers while the at least one spring exerts a position-dependent force upon the mass and while gas passes between the chambers serially through the orifice plate and a passage through the mass which fluidly connects the chambers; and
measuring oscillation characteristics of the assembled mass-damping apparatus including an oscillation frequency of the mass and a characteristic damping time of the mass.

B2. The method of paragraph B1, wherein measure oscillation characteristics of the assembled mass-damping apparatus includes exciting oscillations of the mass and measuring a sequence of subsequent positions of the mass as the mass exhibits undriven, damped oscillation.

B3. The method of paragraph B1, wherein the selected orifice plate is a first orifice plate having a first orifice of a first size, and the method further comprises (a) selecting a second orifice plate having a second orifice of a second size different than the first size, (b) replacing the first orifice plate with the second orifice plate in the mass-damping apparatus, and (c) measuring oscillation characteristics of the mass-damping apparatus including the second orifice plate.

B4. The method of paragraph B1, wherein the gas is atmospheric air.

B5. The method of paragraph B1, wherein the mass is selected to have a weight in a range of 0.5 to 10 percent of the weight of the wind tunnel model.

B6. The method of paragraph B1, wherein the mass-damping apparatus includes a housing that defines the upper and lower gas-filled chambers, the housing including a cylindrical central portion between the upper and lower gas-filled chambers for receiving the mass and a mounting base configured to couple the housing to the wind tunnel model.

B7. The method of paragraph B1, wherein selecting at least one spring includes selecting at least two springs which collectively have an effective spring constant chosen to reduce motion of the wind tunnel model at the natural frequency of the support structure.

C1. A method of reducing dynamic forces on a wind tunnel model during wind tunnel testing, comprising:
selecting a mass with weight equal to a predetermined percentage of weight of the wind tunnel model, the mass having a through passage;
selecting at least one spring with a spring constant chosen based on a natural frequency of a support structure for the wind tunnel model;
attaching to the wind tunnel model a mass-damping apparatus that includes:
    a housing having an interior surface, an interior volume containing a gas, and an axis, the housing configured to be coupled to a wind tunnel model;
    the selected mass configured to move back and forth in the interior volume along the axis, the mass configured to make an airtight seal with the interior surface of the housing, thereby dividing the interior volume into an upper chamber and a lower chamber, the passage through the mass fluidly connecting the chambers; and
    the at least one selected spring configured to exert a position-dependent force upon the mass; and
performing wind tunnel testing upon the model.

C2. The method of paragraph C1, wherein the mass-damping apparatus further includes an orifice plate configured to (a) be seated in a bore in the mass, the bore fluidly connecting the passage and one of the upper and lower chambers, (b) be held in place in the bore by a spring of the at least one springs, and (c) restrict the flow of gas through the passage as the mass moves.

C3. The method of paragraph C2, wherein the orifice plate is selected from a set of orifice plates, each orifice plate including a differently-sized orifice so as to provide a determined degree of damping of the motions of the mass.

C4. The method of paragraph C1, wherein the gas is atmospheric air.

C5. The method of paragraph C1, wherein the mass is selected to have a weight in a range of 0.5 to 10 percent of the weight of the wind tunnel model.

C6. The method of paragraph C1, wherein a portion of the interior surface of the housing is cylindrical and is configured to receive the mass and the housing includes a mounting base configured to couple the housing to the wind tunnel model.

C7. The method of paragraph C1, wherein selecting at least one spring includes selecting at least two springs which collectively have an effective spring constant chosen to reduce motion of the wind tunnel model at the natural frequency of the support structure.

D1. A method of tuning a mass-damping apparatus to reduce dynamic forces on a wind tunnel model during wind tunnel testing, comprising:
selecting a mass with weight equal to a predetermined percentage of weight of the wind tunnel model;

selecting at least one spring with a spring constant chosen to reduce vibrations of the wind tunnel model at a natural frequency of a support structure for the wind tunnel model;

selecting an orifice plate to provide a desired degree of damping of motions of the mass; and installing the mass, the at least one spring, and the orifice plate in a mass-damping apparatus that allows the mass to move back and forth between upper and lower gas-filled chambers while the at least one spring exerts a position-dependent force upon the mass and while gas passes between the chambers serially through the orifice plate and a passage through the mass which fluidly connects the chambers.

ADVANTAGES, FEATURES, BENEFITS

The different embodiments of the tunable mass-damping apparatus described herein provide several advantages over known solutions for reducing vibrations of wind tunnel models arising from the support structure of those models. For example, the illustrative embodiments of the mass dampers described herein allow for convenient calibrating and adjusting of the mass-damping apparatus. Additionally, and among other benefits, illustrative embodiments of the tunable mass damper described herein allow wind tunnel testing to be accomplished over an expanded range of angles and test speeds. This may reduce risk to the model, the test facility, and the test program itself by allowing data to be acquired at test conditions that otherwise would be unattainable, potentially saving several test flights per program. No known system or device can perform these functions, particularly with as compact a device as is described herein. Thus, the illustrative embodiments described herein are particularly useful for wind tunnel testing of models with limited internal space. However, not all embodiments described herein provide the same advantages or the same degree of advantage.

CONCLUSION

The disclosure set forth above may encompass multiple distinct inventions with independent utility. Although each of these inventions has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only, and do not constitute a characterization of any claimed invention. The subject matter of the invention(s) includes all novel and nonobvious combinations and subcombinations of the various elements, features, functions, and/or properties disclosed herein. The following claims particularly point out certain combinations and subcombinations regarded as novel and nonobvious. Invention(s) embodied in other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the invention(s) of the present disclosure.

I claim:

1. A tunable mass-damping apparatus, comprising:
a housing having an interior surface, an interior volume containing a compressible gas, and an axis, the housing configured to be coupled to a wind tunnel model;
a mass configured to move back and forth in the interior volume along the axis, the mass configured to make an airtight seal with the interior surface of the housing, thereby dividing the interior volume into an upper chamber and a lower chamber;
a passage through the mass fluidly connecting the upper chamber and the lower chamber;
a set of removable orifice plates; and
a spring configured to exert a position-dependent force upon the mass;
wherein the spring is characterized by a spring constant chosen based on a natural frequency of a support structure of the wind tunnel model, each orifice plate includes a differently-sized orifice, and each orifice plate is configured to (a) be seated in a bore in the mass, the bore fluidly connecting the passage and one of the upper or lower chambers, (b) be held in place in the bore by the spring, and (c) regulate flow of the compressible gas through the passage as the mass moves.

2. The apparatus of claim 1, wherein the passage has a first lateral dimension, the bore has a second lateral dimension greater than the first lateral dimension, each of the set of removable orifice plates has a third lateral dimension substantially the same as the second lateral dimension, and the differently-sized orifices of the orifice plates are all sized smaller than the first lateral dimension.

3. The apparatus of claim 2, wherein the spring has a fourth lateral dimension that is substantially the same as the third lateral dimension.

4. The apparatus of claim 1, wherein the gas is atmospheric air.

5. The apparatus of claim 1, wherein the spring is an upper spring configured to exert a force upon an upper side of the mass and further including a lower spring configured to exert a force on a lower side of the mass substantially opposite the upper side.

6. The apparatus of claim 5, wherein the upper spring is seated in an upper bore of the mass and the lower spring is seated in a lower bore of the mass, the upper bore fluidly connected to the upper chamber and the passage and the lower bore fluidly connected to the lower chamber and the passage.

7. The apparatus of claim 1, wherein the mass has a weight in a range of 0.5 to 10 percent of a weight of the wind tunnel model.

8. The apparatus of claim 1, wherein the interior surface of the housing is cylindrical and the housing includes a mounting base configured to couple the housing to the wind tunnel model.

9. The apparatus of claim 1, wherein a first end of the spring is seated on an orifice plate of the orifice plates.

10. The apparatus of claim 1, further including a position sensor.

11. A method of calibrating a tunable mass-damping apparatus to reduce dynamic forces on a wind tunnel model during wind tunnel testing, comprising:
selecting a mass with weight equal to a predetermined percentage of weight of the wind tunnel model;
selecting a spring with a spring constant chosen to reduce vibrations of the wind tunnel model at a natural frequency of a support structure for the wind tunnel model;
selecting an orifice plate to provide a degree of damping of motions of the mass;

installing the mass, the spring, and the orifice plate in the mass-damping apparatus that allows the mass to move back and forth between upper and lower gas-filled chambers while the at bast one spring exerts a position-dependent force upon the mass, while the spring holds the orifice plate in place relative to the mass, and while gas passes between the upper and lower gas-filled chambers serially through the orifice plate and a passage through the mass which fluidly connects the upper and lower gas-filled chambers; and measuring oscillation characteristics of the mass-damping apparatus including an oscillation frequency of the mass and a characteristic damping time of the mass.

12. The method of claim 11, wherein measuring oscillation characteristics of the mass-damping apparatus includes exciting oscillations of the mass and measuring a sequence of subsequent positions of the mass as the mass exhibits undriven, damped oscillation.

13. The method of claim 11, wherein the selected orifice plate is a first orifice plate having a first orifice of a first size, and the method further comprises (a) selecting a second orifice plate having a second orifice of a second size different than the first size, (b) replacing the first orifice plate with the second orifice plate in the mass-damping apparatus, and (c) measuring oscillation characteristics of the mass-damping apparatus including the second orifice plate.

14. The method of claim 11, wherein the mass is selected to have a weight in a range of 0.5 to 10 percent of the weight of the wind tunnel model.

15. The method of claim 11, wherein the mass-damping apparatus includes a housing that defines the upper and lower gas-filled chambers, the housing including a cylindrical central portion between the upper and lower gas-filled chambers for receiving the mass and a mounting base configured to couple the housing to the wind tunnel model.

16. The method of claim 11, wherein selecting the spring includes selecting two springs which collectively have an effective spring constant chosen to reduce motion of the wind tunnel model at the natural frequency of the support structure.

17. A method of reducing dynamic forces on a wind tunnel model during wind tunnel testing, comprising:

selecting a mass with weight equal to a predetermined percentage of weight of the wind tunnel model, the mass having a passage through the mass;

selecting a spring with a spring constant chosen based on a natural frequency of a support structure for the wind tunnel model;

attaching to the wind tunnel model a mass-damping apparatus that includes:
  a housing having an interior surface, an interior volume containing a gas, and an axis, the housing configured to be coupled to the wind tunnel model;
  the selected mass configured to move back and forth in the interior volume along the axis, the mass configured to make an airtight seal with the interior surface of the housing, thereby dividing the interior volume into an upper chamber and a lower chamber, the passage through the mass fluidly connecting the chambers; and
  the selected spring configured to exert a position-dependent force upon the mass;

selecting an orifice plate from a set of orifice plates so as to provide a determined degree of damping of motions of the mass;

seating the orifice plate in a bore in the mass, the bore fluidly connected to the passage and one of the upper or lower chambers, and the orifice plate held in place in the bore by the spring, and restricting flow of gas through the passage as the mass moves; and performing wind tunnel testing upon the wind tunnel model.

18. The method of claim 17, wherein the gas is atmospheric air.

19. The method of claim 17, wherein a portion of the interior surface of the housing is cylindrical and is configured to receive the mass and the housing includes a mounting base configured to couple the housing to the wind tunnel model.

20. The method of claim 17, wherein selecting the spring includes selecting two springs which collectively have an effective spring constant chosen to reduce motion of the wind tunnel model at the natural frequency of the support structure.

* * * * *